United States Patent
Kanezaki et al.

(10) Patent No.: US 11,262,024 B2
(45) Date of Patent: Mar. 1, 2022

(54) HIGH PRESSURE TANK AND METHOD OF MANUFACTURING SAME

(71) Applicant: HONDA MOTOR CO., LTD., Tokyo (JP)

(72) Inventors: Toshihiko Kanezaki, Wako (JP); Yusuke Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 16/278,954

(22) Filed: Feb. 19, 2019

(65) Prior Publication Data

US 2019/0257473 A1     Aug. 22, 2019

(30) Foreign Application Priority Data

Feb. 21, 2018  (JP) .............................. JP2018-028515

(51) Int. Cl.
*F17C 1/02* (2006.01)

(52) U.S. Cl.
CPC ........ *F17C 1/02* (2013.01); *F17C 2201/0109* (2013.01); *F17C 2203/011* (2013.01); *F17C 2203/0604* (2013.01); *F17C 2203/0607* (2013.01); *F17C 2203/0619* (2013.01); *F17C 2203/0673* (2013.01); *F17C 2205/0302* (2013.01); *F17C 2209/22* (2013.01); *F17C 2209/232* (2013.01); *F17C 2221/012* (2013.01)

(58) Field of Classification Search
CPC .................. F17C 1/02; F17C 2203/011; F17C 2203/0604; F17C 2203/0619; F17C 2205/0308; F17C 2205/0305; F17C 1/04; F17C 1/06; F17C 1/16; F17C 13/06
USPC .......................................................... 220/590
See application file for complete search history.

(56) References Cited

U.S. PATENT DOCUMENTS

| | | | | |
|---|---|---|---|---|
| 5,287,988 | A * | 2/1994 | Murray | F16J 12/00 220/589 |
| 6,227,402 | B1 * | 5/2001 | Shimojima | F17C 1/16 220/581 |
| 8,640,910 | B2 * | 2/2014 | Novak | F16J 13/02 220/582 |
| 2010/0025411 | A1 * | 2/2010 | Otsubo | F17C 1/14 220/581 |

(Continued)

FOREIGN PATENT DOCUMENTS

| | | |
|---|---|---|
| JP | 11-210988 | 8/1999 |
| JP | 2009-243660 | 10/2009 |

(Continued)

OTHER PUBLICATIONS

Japanese Office Action for Japanese Patent Application No. 2018-028515 dated Sep. 3, 2019.

*Primary Examiner* — Robert Poon
(74) *Attorney, Agent, or Firm* — Amin, Turocy & Watson, LLP

(57) ABSTRACT

A high pressure tank includes: a supplying/discharging hole; and a cap having formed therein a cap-side path which is a part of a flow path. A repelling coating interposes between a liner-side end surface facing a resin-made liner, of a flange section configuring the cap, or a flange section-facing outer surface facing the flange section, of the liner. The repelling coating is formed of a material that repels a matrix resin of a fiber-reinforced resin configuring a reinforced layer.

5 Claims, 2 Drawing Sheets

(56) References Cited

U.S. PATENT DOCUMENTS

2011/0240655 A1* 10/2011 Lindner ................ F17C 13/026
                                                                              220/589
2012/0048862 A1* 3/2012 Otsuka .................... F17C 13/06
                                                                              220/495.01

FOREIGN PATENT DOCUMENTS

| JP | 2009-243675 | 10/2009 |
| JP | 2017-129193 | 7/2017 |
| JP | 2017-194150 | 10/2017 |

* cited by examiner

HIGH PRESSURE TANK AND METHOD OF MANUFACTURING SAME

CROSS-REFERENCE TO RELATED APPLICATION

This application is based upon and claims the benefit of priority from Japanese Patent Application No. 2018-028515 filed on Feb. 21, 2018, the contents of which are incorporated herein by reference.

BACKGROUND OF THE INVENTION

Field of the Invention

The present invention relates to a high pressure tank that includes a liner, a reinforced layer, and a cap, and to a method of manufacturing the high pressure tank.

Description of the Related Art

A high pressure tank is widely used as a container for storing a fluid such as a gas or a liquid. For example, the high pressure tank is installed in a fuel cell vehicle as a container for storing hydrogen gas to be supplied to a fuel cell system.

As disclosed in Japanese Laid-Open Patent Publication No. 2009-243675, there is known as an example of this kind of high pressure tank a high pressure tank that includes: a liner, made of a resin, that stores the fluid on a hollow inside thereof; a reinforced layer (the "shell" mentioned in Japanese Laid-Open Patent Publication No. 2009-243675), made of a fiber-reinforced resin, that covers an outer surface of the liner in order to reinforce the liner; and a cap (the "end boss" mentioned in Japanese Laid-Open Publication Patent No. 2009-243675) having formed therein a supplying/discharging hole for supplying/discharging the fluid to/from the hollow inside of the liner. This supplying/discharging hole is provided with the likes of a valve, for example. By operating the valve, and so on, it is possible for the fluid to be supplied to the inside of the liner, or, conversely, for the fluid stored on the inside of the liner to be discharged, via the supplying/discharging hole.

Incidentally, it tends to be the case that when a gas is employed as the fluid, a liner made of a resin is more easily permeated by the gas compared to a metal liner formed of the likes of an aluminum alloy. Therefore, when filling with the gas is performed at high pressure, the gas is assumed to permeate the liner and accumulate between the outer surface of the liner and the reinforced layer, and so on. When the gas is discharged from the inside of the liner in this state, the inside of the liner conceivably attains a lower pressure than between the outer surface of the liner and the reinforced layer. There is concern that when such a situation occurs, a gap will occur between the liner and the reinforced layer, or so-called buckling where a portion that has separated from the reinforced layer, of the liner bulges out toward the inside will occur, whereby durability of the liner lowers.

In order to dispel this concern, Japanese Laid-Open Patent Publication No. 11-210988 proposes forming a flow path (the "gas venting hole" mentioned in Japanese Laid-Open Patent Publication No. 11-210988) in the cap. Due to this configuration, the gas that has entered between the liner and the reinforced layer can be discharged to outside via the flow path.

SUMMARY OF THE INVENTION

In order to manufacture the high pressure tank, first, the cap is attached to the liner which is made of a resin, and then a reinforced fiber that has been pre-impregnated with a matrix resin as a resin liquid is wound around a part of the cap and each of outer surfaces of the liner. Simultaneously to this winding-round or subsequently, the matrix resin with which the reinforced fiber has been impregnated is hardened. Due to this hardening, the reinforced layer formed of the fiber-reinforced resin is formed, and the high pressure tank is obtained.

The matrix resin before hardening has a low enough viscosity to allow it to flow. Therefore, the matrix resin with which the reinforced fiber has been impregnated is assumed to flow into a slight clearance between the cap and the liner. Supposing that such a situation occurs and the matrix resin ends up reaching the flow path and thereby blocking an opening of the flow path, then it will become difficult to discharge the gas that has entered between the liner and the reinforced layer.

A main object of the present invention is to provide a high pressure tank by which a gas that has entered between a liner and a reinforced layer can be easily discharged from between the two, and a method of manufacturing the high pressure tank.

According to an embodiment of the present invention, there is provided a high pressure tank including: a liner formed of a resin; a reinforced layer formed of a fiber-reinforced resin, the reinforced layer covering an outer surface of the liner; and a cap having formed therein a supplying and discharging hole for supplying a fluid to the liner or discharging the fluid from the liner, the cap including: a flange section interposing between the liner and the reinforced layer; and an exposed section exposed from the reinforced layer, there being formed in the flange section a flow path running from a liner-side end surface facing the liner to the supplying/discharging hole, of the cap, and there being formed on at least one of the liner-side end surface, or a flange section-facing outer surface facing the flange section, of the liner a repelling coating that repels a matrix resin of the fiber-reinforced resin.

Moreover, according to another embodiment of the present invention, there is provided a method of manufacturing a high pressure tank, the high pressure tank including: a liner formed of a resin; a reinforced layer formed of a fiber-reinforced resin, the reinforced layer covering an outer surface of the liner; and a cap having formed therein a supplying/discharging hole for supplying/discharging a fluid to/from the liner, the cap including: a flange section interposing between the liner and the reinforced layer; and an exposed section exposed from the reinforced layer, and there being formed in the flange section a flow path running from a liner-side end surface facing the liner to the supplying/discharging hole, of the cap, the method including the steps of:

forming on at least one of the liner-side end surface, or a flange section-facing outer surface facing the flange section, of the liner a repelling coating that repels a matrix resin of the fiber-reinforced resin;

attaching the cap to the liner;

covering with a reinforced fiber the outer surface of the liner and an outer surface of the flange section; and hardening the matrix resin with which the reinforced fiber has been impregnated and thereby obtaining the reinforced layer.

Note that the step of covering with the reinforced fiber and the step of hardening the matrix resin may be simultaneous, or may be separate. The present invention is assumed to include both.

Thus, in the present invention, a repelling coating is formed on at least one of a liner-side end surface facing a liner, of a flange section of a cap, or a flange section-facing outer surface facing the flange section, of the liner. The repelling coating is formed of a material that repels a matrix resin of a fiber-reinforced resin configuring a reinforced layer. Therefore, even if a molten matrix resin (a resin liquid) attempts to enter between the liner-side end surface and the flange section-facing outer surface, it is repelled by the repelling coating. As a result, it is prevented that the resin liquid enters between the liner-side end surface and the flange section-facing outer surface, or that the resin liquid hardens in an opening of a flow path.

Therefore, the opening of the flow path is prevented from being blocked by a resin. This makes it easy for a fluid that has entered between the liner and the reinforced layer to be returned to a supplying/discharging hole via the flow path. That is, the fluid that has entered between the liner and the reinforced layer can be easily discharged.

An epoxy-based resin may be cited as a typical example of the matrix resin of the reinforced layer (the fiber-reinforced resin). In this case, a material that repels the epoxy-based resin should be selected as a material of the repelling coating. A fluorine-based resin or a silicone-based resin can be cited as a preferred example of such a material.

A protective member is preferably installed interposed between the flange section and the reinforced layer. The liner expands as the fluid is supplied. At this time, the protective member is crushed in an elastic deformation range, whereby a pressing force from the liner on the cap or the reinforced layer, or a reaction force on the liner from the reinforced layer, is relieved. As a result, it is prevented that fatigue accumulates in the cap or reinforced layer and the liner, or that damage occurs due to this accumulation of fatigue.

When the protective member is provided, it is preferable that a second repelling coating repelling the matrix resin is formed on at least one of a reinforced layer-side end surface facing the reinforced layer, of the flange section, or a flange section-facing inner surface facing the flange section, of the protective member. This is because it thereby becomes even more difficult for the resin liquid to reach between the liner-side end surface and the flange section-facing outer surface which are on an inner side of the protective member.

Due to the present invention, a configuration is adopted whereby the repelling coating is formed on at least one of the liner-side end surface facing the liner, of the flange section of the cap, or the flange section-facing outer surface facing the flange section, of the liner. This repelling coating repels the matrix resin of the fiber-reinforced resin configuring the reinforced layer, so when the reinforced layer is formed, the molten matrix resin (the resin liquid) is prevented from entering between the liner-side end surface and the flange section-facing outer surface.

That is, it is difficult for the resin liquid to enter between the cap and the liner. It is therefore prevented that the resin liquid hardens in the flow path opened in the liner-side end surface or that the resin liquid thereby blocks the flow path. As a result, the fluid that has entered between the liner and the reinforced layer can be easily discharged from between the two.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a high pressure tank and a method of manufacturing the same according to the present invention will be presented and described in detail below with reference to the accompanying drawings.

Figure 1:
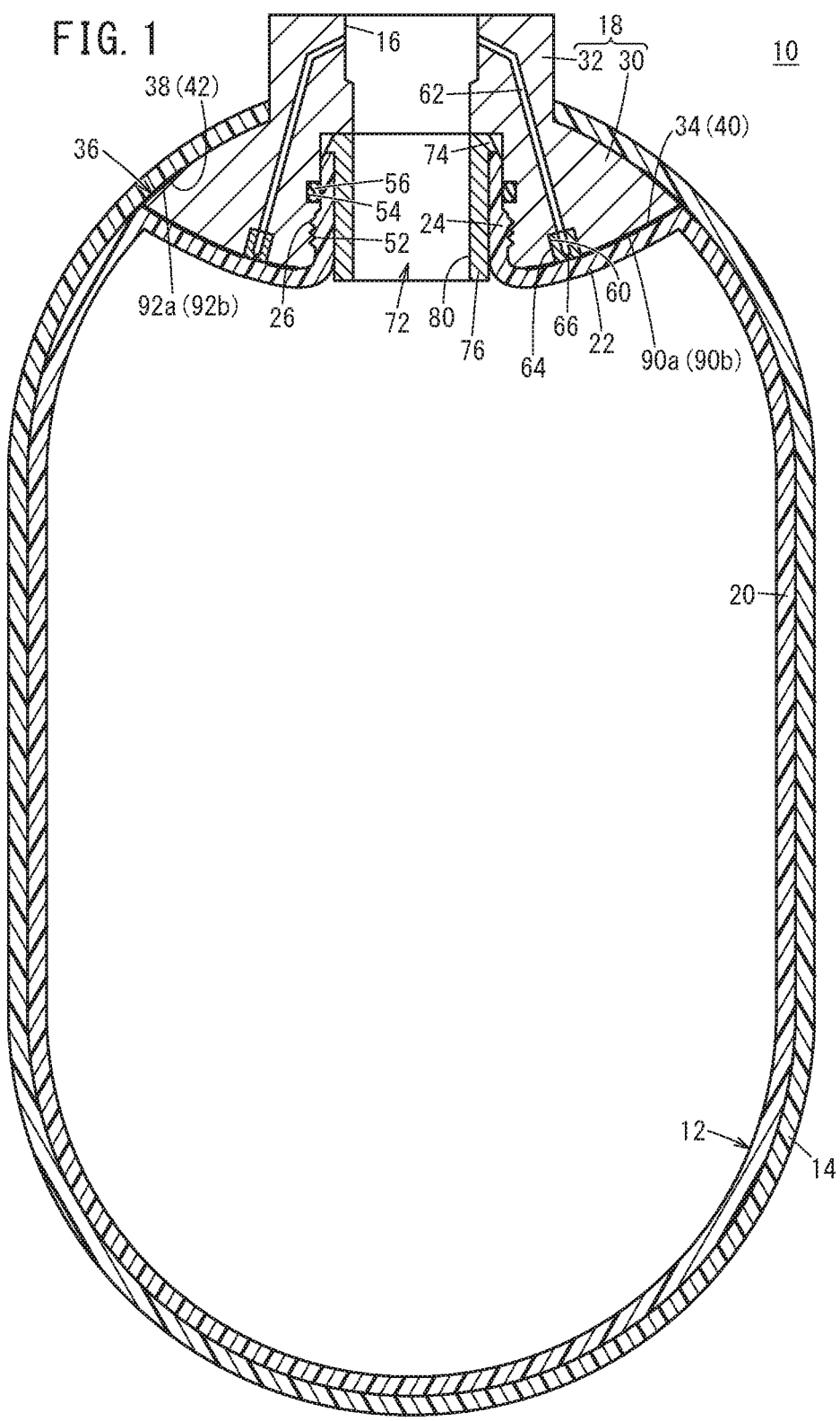
FIG. 1 is an overall schematic cross-sectional side view along an axis direction of a high pressure tank according to an embodiment of the present invention.

FIG. 1 is an overall schematic cross-sectional side view along an axis direction of a high pressure tank 10 according to the present embodiment. This high pressure tank 10 includes: a liner 12 as an inner layer; a reinforced layer 14 as an outer layer; and a cap 18 having formed therein a supplying/discharging hole 16.

The liner 12 is a hollow body formed of a resin, and is capable of storing on its inside various kinds of fluids such as hydrogen gas, for example. The liner 12 includes: a main body section 20 whose outer surface is covered by the reinforced layer 14; a sunken section 22 that sinks toward an inside of the main body section 20; and a cylindrical section 24 that projects from the sunken section 22 toward an outside of the main body section 20. An outer circumferential wall of the cylindrical section 24 is provided with a male screw thread 26.

Moreover, the reinforced layer 14 is formed of a fiber-reinforced resin. As will be mentioned later, the reinforced layer 14 is provided by winding a reinforced fiber around the liner 12 and then impregnating the reinforced fiber with a matrix resin. In the present embodiment, a carbon fiber is employed as the reinforced fiber, and an epoxy-based resin is employed as the matrix resin.

The cap 18 is formed of a metal, for example, and includes: a flange section 30 interposing between the liner 12 and the reinforced layer 14; and an exposed section 32 integrally connected to the flange section 30 and of smaller diameter compared to the flange section 30. The cap 18 is configured such that the flange section 30, together with the liner 12, are covered by the reinforced layer 14, and such that the exposed section 32 projects so as to be exposed from an opening of the reinforced layer 14.

Figure 2:
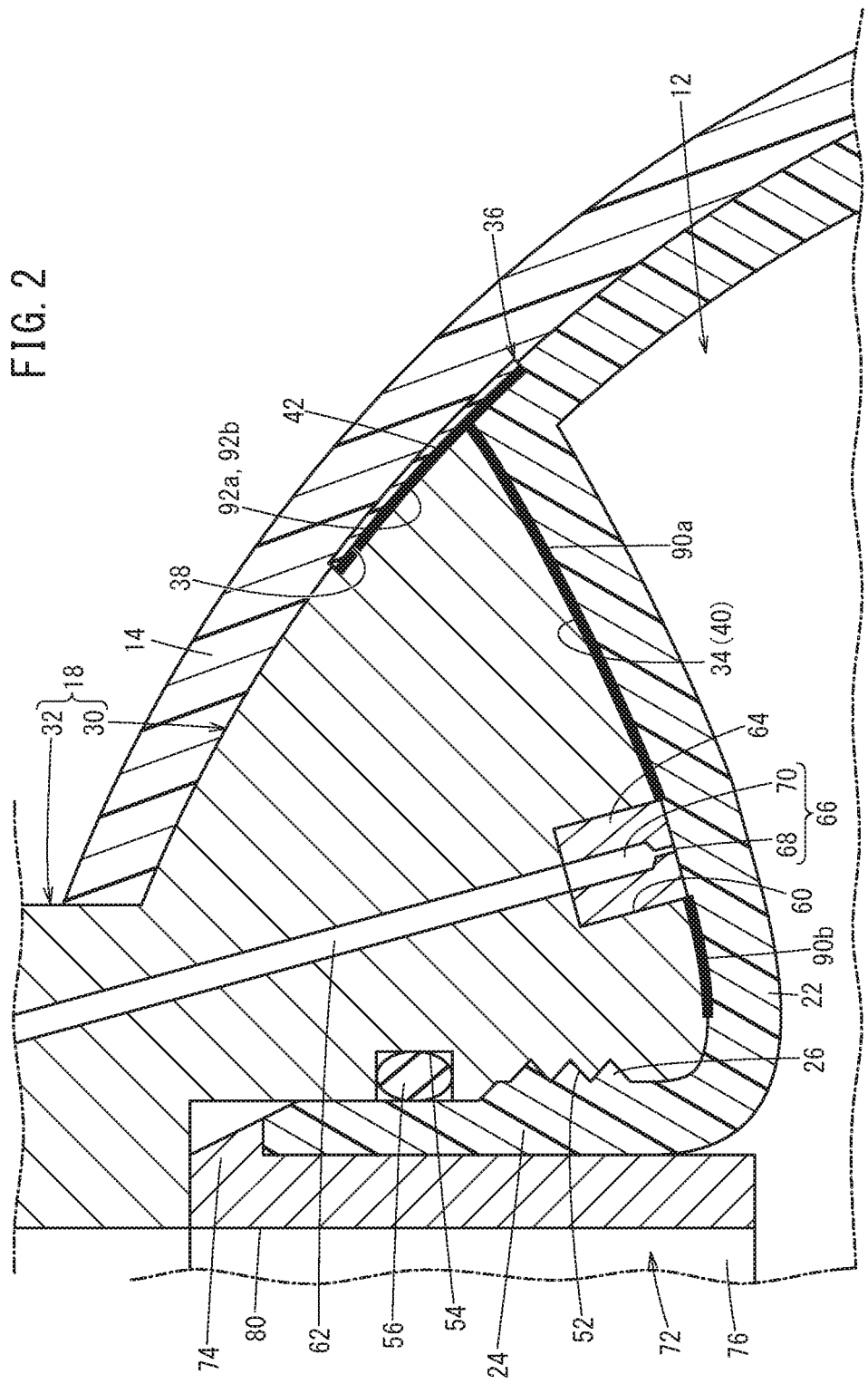
FIG. 2 is an enlarged cross-sectional view of essential parts in a vicinity of a cap of the high pressure tank of FIG. 1.

Therefore, as shown in detail in FIG. 2, the flange section 30 includes: a liner-side end surface 34 that abuts on an outer surface of the sunken section 22 of the liner 12; and a reinforced layer-side end surface 38 that, together with the liner 12 and a protective member 36 (mentioned later), is covered by the reinforced layer 14. That is, the outer surface of the sunken section 22 of the liner 12 is a flange section-facing outer surface 40 facing the flange section 30, and a region facing the flange section 30 in an inner surface of the protective member 36 is a flange section-facing inner surface 42.

The supplying/discharging hole 16 extends spanning from the flange section 30 to the exposed section 32. A female screw thread 52 is formed in an inner circumferential wall of the supplying/discharging hole 16, and the previously described male screw thread 26 is screwed into the female screw thread 52. This screwing results in the cap 18 being externally installed in the cylindrical section 24.

A seal groove 54 sunken in a ring shape is formed more to an upstream side in a fluid supplying direction than the female screw thread 52. A seal member 56 formed of an O ring is arranged on an inside of this seal groove 54. The seal member 56 seals any gap between an outer circumferential surface of the cylindrical section 24 and an inner circumferential surface of the supplying/discharging hole 16.

The cap 18 has further formed therein an insertion hole 60 and a cap-side path 62 whose cross-sectional shapes are each circular. The insertion hole 60 extends with a certain length from the liner-side end surface 34 toward an exposed section 32 side of the flange section 30, and communicates with one end side of the cap-side path 62. A plurality of the insertion holes 60 and the cap-side paths 62 are provided at fixed intervals in a circumferential direction of the cap 18.

A plug 64 is inserted in the insertion hole 60. The plug 64 is a cylindrical body formed from a similar metal to the cap 18, for example, and has formed therein penetrating along its axial direction a plug-side path 66. The plug-side path 66 is formed of: a small diameter path 68 formed on one end side in the axial direction of the plug 64; and a large diameter path 70 connected to the small diameter path 68 and whose inner diameter is slightly larger than that of the small diameter path 68. A diameter of the large diameter path 70 is set to be substantially the same as a diameter of the cap-side path 62.

The plurality of cap-side paths 62 are bent such that after extending slightly inclined with respect to the axis direction of the high pressure tank 10, they are directed toward the inner circumferential surface of the supplying/discharging hole 16, so as to focus as they are directed along the inside of the cap 18 from the insertion hole 60 toward the exposed section 32.

The plug-side path 66 and the cap-side path 62 formed as above function as a fluid guiding path by which the fluid (specifically, a gas) that has entered between the liner 12 and the cap 18 is guided to the supplying/discharging hole 16.

A collar 72 is further arranged on the inside of the supplying/discharging hole 16. The collar 72 is made of a metal, for example, and includes: a head section 74 of circular ring shape; and a cylinder section 76 of cylindrical shape provided integrally with the head section 74 and of smaller diameter compared to the head section 74. The cylindrical section 24 is sandwiched by an outer circumferential surface of the cylinder section 76 and the inner circumferential surface of the supplying/discharging hole 16 of the flange section 30, and is thereby firmly supported. Moreover, a passage hole 80 communicating with the supplying/discharging hole 16 is formed penetrating along an axis direction of the cylinder section 76, in the collar 72.

Furthermore, the protective member 36 is installed interposed between the flange section 30 and the reinforced layer 14. The protective member 36 has a shape of an umbrella that has had its top cut off or a substantially circular ring shape, and straddles from the reinforced layer-side end surface 38 of the flange section 30 to the outer surface of the main body section 20 of the liner 12. That is, the protective member 36 is sandwiched between the flange section 30 and the reinforced layer 14 and between the main body section 20 and the reinforced layer 14, thereby having its position firmly fixed and filling a clearance between each of the sections and layers.

The protective member 36 can be manufactured by, for example, injection molding molten polyethylene.

In the above configuration, first repelling coatings 90a, 90b (repelling coatings) are respectively formed on the liner-side end surface 34 of the flange section 30 and the flange section-facing outer surface 40 of the liner 12. Moreover, second repelling coatings 92a, 92b (second repelling coatings) are respectively formed on the reinforced layer-side end surface 38 of the flange section 30 and the flange section-facing inner surface 42 of the protective member 36. Note that although shown exaggerated in FIGS. 1 and 2, in the present embodiment, the first repelling coatings 90a, 90b and the second repelling coatings 92a, 92b are formed by coating, and thicknesses of each are extremely small. A thickness of the protective member 36 is also similarly extremely slight. Therefore, a distinct level difference is never formed between the liner 12 and the cap 18, between the cap 18 and the reinforced layer 14, between the liner 12 and the protective member 36, and so on.

A material having non-affinity with the matrix resin of the reinforced layer 14, that is, a material having a property of repelling the matrix resin, is selected as a material of the first repelling coatings 90a, 90b and the second repelling coatings 92a, 92b. In the present embodiment where the matrix resin is an epoxy-based resin, a fluorine-based resin or a silicone-based resin may be cited as a preferred material of the first repelling coatings 90a, 90b and the second repelling coatings 92a, 92b. More specifically, a mold release material employed in injection molding can be adopted.

Although it is sufficient for the first repelling coating 90a of the liner-side end surface 34 to be formed in a range from an outer circumferential edge section of the flange section 30 to an outer circumferential side edge section of the insertion hole 60, a configuration may be adopted whereby it is further formed in a range from an outer circumferential side edge section of the supplying/discharging hole 16 to an inner circumferential side edge section of the insertion hole 60. In other words, the first repelling coating 90a is formed in a region avoiding the small diameter path 68 which is a part of the plug-side path 66.

The first repelling coating 90b of the flange section-facing outer surface 40 is formed in a region facing the first repelling coating 90a, for example. Note that even in the case where the first repelling coating 90a is formed only in the range from the outer circumferential edge section of the flange section 30 to the outer circumferential side edge section of the insertion hole 60, a configuration may be adopted whereby the first repelling coating 90b is formed in a region facing that range, and in a region facing the range from the outer circumferential side edge section of the supplying/discharging hole 16 to the inner circumferential side edge section of the insertion hole 60.

Note that it is not essential for the first repelling coatings 90a, 90b to both be formed, and a configuration may be adopted whereby only one of them is formed.

The second repelling coating 92b of the protective member 36 is formed on at least the flange section-facing inner surface 42. Note that a configuration may be adopted whereby the second repelling coating 92b is formed also in a region facing the liner 12.

Next, a method of manufacturing the high pressure tank 10 according to the present embodiment will be described. Note that hereafter, the case where both the first repelling coatings 90a, 90b and the second repelling coatings 92a, 92b are formed, will be exemplified.

In order to obtain the high pressure tank 10, first, the liner 12 is manufactured by the likes of blow molding using a molten material of the likes of a high-density polyethylene (HDPE) resin.

Next, the first repelling coatings 90a, 90b are respectively formed on the liner-side end surface 34 of the flange section 30 and the flange section-facing outer surface 40 of the liner 12. In order to do this, spray coating of a mold release material including a fluorine-based resin or a silicone-based resin, for example, should be performed. Drying of a solvent results in the first repelling coatings 90a, 90b formed of the fluorine-based resin or the silicone-based resin being formed. As described above, the first repelling coatings 90a, 90b are formed in a region avoiding the small diameter path 68 which is a part of the plug-side path 66.

Next, the cap 18 is attached to the cylindrical section 24 of the liner 12. That is, the female screw thread 52 formed in the inner circumferential wall of the supplying/discharging hole 16 of the cap 18 is screwed into the male screw thread 26 of the cylindrical section 24. At this time, the first repelling coatings 90a, 90b face each other. Note that a configuration may be adopted whereby the second repelling coating 92a of the reinforced layer-side end surface 38 of the flange section 30 is formed before this attachment, or a configuration may be adopted whereby it is formed after the attachment.

On the other hand, the second repelling coating 92b is formed on at least the flange section-facing inner surface 42 of the protective member 36. The second repelling coatings 92a, 92b, similarly to the first repelling coatings 90a, 90b, can be formed by performing spray coating of a mold release material including a fluorine-based resin or a silicone-based resin, for example. Note that as described above, a configuration may be adopted whereby the second repelling coating 92b is formed over an entire inner surface of the protective member 36.

The exposed section 32 of the cap 18 is passed through a through-hole of this protective member 36. Furthermore, the flange section-facing inner surface 42 is abutted on the reinforced layer-side end surface 38 of the flange section 30. A part of the inner surface of the protective member 36 abuts on the outer surface of the main body section 20 of the liner 12.

Next, a major portion of an outer circumferential wall of the exposed section 32 of the cap 18, an outer surface of the protective member 36, and the outer surface of the main body section 20 of the liner 12 are wound around by a carbon fiber (the reinforced fiber) that has been impregnated with the resin liquid of the epoxy-based resin. That is, one end of the carbon fiber wound around a feeder is drawn out and, in the course of being sent forth to a liner 12 side, the carbon fiber is dipped in the resin liquid of the epoxy-based resin. As a result, the resin liquid permeates a gap between carbon fibers. That is, the carbon fiber is impregnated with the resin liquid.

The carbon fiber that has been impregnated with the resin liquid in this way is further sent forth to the liner 12 side. The liner 12 is held in a movable and rotatable holding shaft, and moves and rotates together with the holding shaft. With movement and rotation of the liner 12, the carbon fiber impregnated with the resin liquid is wound around in a spiral shape or a mesh-like shape. Due to the above, the major portion of the outer circumferential wall of the exposed section 32 of the cap 18, the outer surface of the protective member 36, and the outer surface of the main body section 20 of the liner 12 are covered by the carbon fiber.

As described above, even if the first repelling coatings 90a, 90b or second repelling coatings 92a, 92b and the protective member 36 are provided, a significant level difference is never formed. It can therefore be avoided that a stress acts on the carbon fiber due to the carbon fiber catching on a level difference when the carbon fiber is wound around the liner 12.

The resin liquid with which the carbon fiber has been impregnated hardens by heating. This hardening leads to the reinforced layer 14 formed of the fiber-reinforced resin being formed and the high pressure tank 10 being obtained. Note that a configuration may be adopted whereby the heating is performed simultaneously to winding-round of the carbon fiber, or a configuration may be adopted whereby it is performed after the carbon fiber has been wound around.

The resin liquid before hardening has a low enough viscosity to allow it to flow. Therefore, the resin liquid is assumed to seep out from the carbon fiber. Now, in the present embodiment, the second repelling coatings 92a, 92b interpose between the reinforced layer-side end surface 38 of the flange section 30 and the flange section-facing inner surface 42 of the protective member 36. Therefore, even in the case that the resin liquid has seeped out, it is difficult for the resin liquid to advance further inside than the protective member 36.

Moreover, the protective member 36 straddles from the cap 18 to the liner 12, so a boundary between the main body section 20 and the sunken section 22, in other words, a butting end surface where the reinforced layer-side end surface 38 of the flange section 30 and the main body section 20 face each other, is covered by the protective member 36. Due to this, combined also with a labyrinth structure being formed, it is difficult for the resin liquid to reach the previously described butting end surface.

Even supposing the resin liquid has reached the previously described butting end surface, the first repelling coatings 90a, 90b are interposed between the liner-side end surface 34 of the flange section 30 and the flange section-facing outer surface 40 of the liner 12 (the sunken section 22). The resin liquid that has reached the previously described butting end surface is repelled by the first repelling coatings 90a, 90b. That is, the resin liquid is prevented from entering between the flange section-facing outer surface 40 and the liner-side end surface 34.

For the above kinds of reasons, the resin liquid is prevented from reaching the small diameter path 68 of the plug-side path 66. It is thus avoided that the resin liquid hardens in an opening of the small diameter path 68 or that the small diameter path 68 is blocked by this hardening. That is, the opening of the small diameter path 68 can be maintained in an opened state.

When hydrogen, for example, is stored on the inside of the high pressure tank 10, the hydrogen passes through the supplying/discharging hole 16 of the cylindrical section 24 and the passage hole 80 of the collar 72 to be supplied to the hollow inside of the liner 12. At this time, the liner 12 slightly expands due to its internal pressure rising, and presses the flange section 30 of the cap 18.

The protective member 36 installed interposed between the flange section 30 and the reinforced layer 14 shows sufficient elasticity due to being formed of a resin. Therefore, when the cap 18 is pressed by the liner 12 expanding, the protective member 36 is slightly crushed. This crushing results in a pressing force (a load) from the cap 18 toward the reinforced layer 14 being relieved. Therefore, a reaction force from the reinforced layer 14 acting on the cap 18 or liner 12 becomes smaller. As a result, the load acting on the cap 18, the liner 12, and the reinforced layer 14 becomes smaller, so it is avoided that these liner 12 or cap 18 and the reinforced layer 14 are damaged. That is, the high pressure tank 10 can be configured to have excellent durability.

Sometimes, some of the high pressure hydrogen stored within the liner 12 permeates the liner 12 and enters between the liner 12 and the reinforced layer 14. This hydrogen is led out to the supplying/discharging hole 16 via the plug-side path 66 and the cap-side path 62 and returned to the inside of the liner 12 from the supplying/discharging hole 16, or is discharged accompanied by hydrogen released from the supplying/discharging hole 16. Since the opening of the small diameter path 68 is prevented from being blocked, the above-described discharging of the hydrogen proceeds smoothly.

The present invention is not particularly limited to the above-described embodiment, and may be variously modified in a range not departing from the spirit of the present invention.

For example, in the case that the matrix resin of the reinforced layer 14 is a resin other than an epoxy-based resin, a material that repels that resin should be selected as a material of the first repelling coatings 90*a*, 90*b* and the second repelling coatings 92*a*, 92*b*.

Moreover, the high pressure tank 10 may be configured without providing the protective member 36.

What is claimed is:

1. A high pressure tank comprising: a liner formed of a resin; a reinforced layer formed of a fiber-reinforced resin, the reinforced layer covering an outer surface of the liner; and a cap having formed therein a supplying and discharging hole for supplying a fluid to the liner or discharging the fluid from the liner,
   the cap including: a flange section interposing between the liner and the reinforced layer; and an exposed section exposed from the reinforced layer,
   the flange section including: a liner-side end surface facing the liner; and a reinforced layer-side end surface facing the reinforced layer, there being formed in the flange section a flow path running from the liner-side end surface to the supplying and discharging hole,
   the liner including a flange section-facing outer surface facing the flange section, and
   there being formed on at least one of the liner-side end surface of the flange section, or the flange section-facing outer surface of the liner, in a region avoiding the flow path, a repelling coating that repels a matrix resin of the fiber-reinforced resin.

2. The high pressure tank according to claim 1, wherein the matrix resin is formed of an epoxy-based resin, and the repelling coating is formed of a fluorine-based resin or a silicone-based resin.

3. The high pressure tank according to claim 1, wherein a protective member is installed interposed between the flange section and the reinforced layer, the protective member including a flange section-facing inner surface facing the flange section, and there is formed on at least one of the reinforced layer-side end surface of the flange section, or the flange section-facing inner surface of the protective member a second repelling coating that repels the matrix resin.

4. The high pressure tank according to claim 3, wherein the second repelling coating is formed of a fluorine-based resin or a silicone-based resin.

5. The high pressure tank according to claim 1, wherein a protective member is installed interposed between the flange section and the reinforced layer, the protective member including a flange section-facing inner surface facing the flange section, and there is formed on at least one of the reinforced layer-side end surface of the flange section, or a flange section-facing inner surface of the protective member a second repelling coating that repels the matrix resin, and wherein the protective member extends from a position between the flange section and the reinforced layer to a position between the resin liner and the reinforced layer.

* * * * *